(12) United States Patent
Madsen et al.

(10) Patent No.: US 10,661,885 B2
(45) Date of Patent: May 26, 2020

(54) SHAPE MEMORY ALLOY ACTIVE SPARS FOR BLADE TWIST

(75) Inventors: Casey Lyn Madsen, Normandy Park, WA (US); Daniel J. Clingman, Milton, WA (US); Glenn S. Bushnell, Puyallup, WA (US)

(73) Assignee: The Boeing Company, Chicago, IL (US)

(*) Notice: Subject to any disclaimer, the term of this patent is extended or adjusted under 35 U.S.C. 154(b) by 495 days.

(21) Appl. No.: 13/472,695

(22) Filed: May 16, 2012

(65) Prior Publication Data

US 2013/0309089 A1 Nov. 21, 2013

(51) Int. Cl.
| | |
|---|---|
| *B64C 3/18* | (2006.01) |
| *B64C 3/48* | (2006.01) |
| *B64C 3/52* | (2006.01) |
| B64C 3/44 | (2006.01) |
| B64C 27/72 | (2006.01) |
| B64C 27/473 | (2006.01) |

(52) U.S. Cl.
CPC ............... *B64C 3/185* (2013.01); *B64C 3/48* (2013.01); *B64C 3/52* (2013.01); *B64C 2003/445* (2013.01); *B64C 2027/4733* (2013.01); *B64C 2027/7222* (2013.01); *Y02T 50/34* (2013.01)

(58) Field of Classification Search
CPC .... F04D 15/0061; F04D 27/00; F04D 27/002; F04D 29/287; F04D 29/305; F04D 29/323; F04D 29/368; F04D 29/362; F04D 29/382; F05B 2240/311; F05B 2280/5006; F05D 2300/505; B64C 3/185; B64C 3/18; B64C 3/52; B64C 2027/4733; B64C 27/32

USPC ...... 416/1, 39, 226, 241 R, 23, 240; 415/12; 60/527–529

See application file for complete search history.

(56) References Cited

U.S. PATENT DOCUMENTS

| | | | | |
|---|---|---|---|---|
| 3,042,371 A | * | 7/1962 | Fanti ..................... | F04D 29/368 244/219 |
| 3,764,227 A | * | 10/1973 | Albertzart ....................... | 416/39 |
| 3,930,626 A | * | 1/1976 | Croswell, Jr. ................. | 244/219 |
| 4,400,642 A | * | 8/1983 | Kiraly ............................ | 310/332 |
| 4,518,444 A | * | 5/1985 | Albrecht et al. .............. | 148/402 |

(Continued)

FOREIGN PATENT DOCUMENTS

| | | |
|---|---|---|
| DE | 102004063093 A1 | 7/2006 |
| EP | 2076865 A2 | 7/2009 |

(Continued)

OTHER PUBLICATIONS

China First Office Action for related application No. 201310181121.6 dated Feb. 1, 2016; 21 pp.

(Continued)

*Primary Examiner* — David E Sosnowski
*Assistant Examiner* — Wayne A Lambert
(74) *Attorney, Agent, or Firm* — Kwan & Olynick LLP

(57) ABSTRACT

A system for changing a shape a structural spar includes, in an exemplary embodiment, a plurality of adjoining structural strips axially aligned to form the structural spar. At least one of the structural strips is formed from a shape memory alloy. The system also includes a temperature control system to control a temperature of the at least one shape memory alloy strip. Heat applied to the at least one shape memory alloy strip causes the structural spar to twist or bend.

20 Claims, 6 Drawing Sheets

(56) References Cited

U.S. PATENT DOCUMENTS

| | | | | |
|---|---|---|---|---|
| 4,637,962 | A * | 1/1987 | Albrecht et al. | 428/616 |
| 4,868,447 | A * | 9/1989 | Lee et al. | 310/328 |
| 5,114,104 | A * | 5/1992 | Cincotta et al. | 244/219 |
| 5,224,826 | A * | 7/1993 | Hall | B64C 3/44 310/323.17 |
| 5,374,011 | A * | 12/1994 | Lazarus et al. | 244/99.8 |
| 5,440,193 | A * | 8/1995 | Barrett | 310/328 |
| 5,611,874 | A * | 3/1997 | Zadno-Azizi et al. | 148/402 |
| 5,619,177 | A * | 4/1997 | Johnson | H01H 59/0009 251/129.01 |
| 5,662,294 | A * | 9/1997 | Maclean et al. | 244/219 |
| 5,869,189 | A | 2/1999 | Hagood, IV et al. | |
| 6,015,263 | A * | 1/2000 | Morris | F04D 29/388 415/1 |
| 6,048,622 | A * | 4/2000 | Hagood et al. | 428/461 |
| 6,065,934 | A | 5/2000 | Jacot et al. | |
| 6,182,929 | B1 * | 2/2001 | Martin et al. | 244/219 |
| 6,209,824 | B1 * | 4/2001 | Caton et al. | 244/213 |
| 6,260,567 | B1 * | 7/2001 | Gruensfelder et al. | 137/1 |
| 6,419,187 | B1 * | 7/2002 | Buter et al. | 244/35 R |
| 6,499,952 | B1 | 12/2002 | Jacot et al. | |
| 6,588,709 | B1 * | 7/2003 | Dunne et al. | 244/201 |
| 6,669,444 | B2 * | 12/2003 | Alacqua et al. | 416/132 A |
| 6,989,197 | B2 * | 1/2006 | Schneider | 428/416 |
| 7,037,076 | B2 | 5/2006 | Jacot et al. | |
| 7,159,398 | B1 | 1/2007 | Bushnell et al. | |
| 7,669,799 | B2 * | 3/2010 | Elzey et al. | 244/123.12 |
| 7,878,459 | B2 | 2/2011 | Mabe et al. | |
| 8,043,045 | B2 * | 10/2011 | Clark | F01D 5/148 415/48 |
| 8,104,793 | B2 * | 1/2012 | Browne et al. | 280/753 |
| 8,118,264 | B2 | 2/2012 | Mabe et al. | |
| 8,202,056 | B2 * | 6/2012 | Rice | F01D 7/00 416/229 A |
| 8,246,303 | B2 * | 8/2012 | Thomas et al. | 416/23 |
| 2002/0113499 | A1 * | 8/2002 | von Behrens | F03G 7/065 310/306 |
| 2004/0067134 | A1 * | 4/2004 | Beauchamp et al. | 416/37 |
| 2004/0197519 | A1 | 10/2004 | Eizey et al. | |
| 2004/0204676 | A1 * | 10/2004 | Anderson | A61L 29/02 604/95.05 |
| 2005/0099261 | A1 * | 5/2005 | Walak | 337/382 |
| 2006/0125291 | A1 * | 6/2006 | Buravalla et al. | 296/204 |
| 2007/0182146 | A1 * | 8/2007 | Browne et al. | 280/753 |
| 2008/0302024 | A1 * | 12/2008 | Browne | E04B 1/00 52/1 |
| 2009/0175726 | A1 * | 7/2009 | Rosati et al. | 416/147 |
| 2009/0212158 | A1 * | 8/2009 | Mabe et al. | 244/1 N |
| 2011/0064579 | A1 * | 3/2011 | Thomas et al. | 416/146 R |
| 2011/0217170 | A1 | 9/2011 | Buffone et al. | |
| 2011/0255974 | A1 * | 10/2011 | Nanukuttan et al. | 416/146 R |
| 2011/0300358 | A1 * | 12/2011 | Blohowiak et al. | 428/215 |

FOREIGN PATENT DOCUMENTS

| | | |
|---|---|---|
| EP | 2078865 A2 | 7/2009 |
| EP | 2333334 A2 | 6/2011 |
| JP | S63128529 A | 6/1988 |
| JP | H09305233 A | 11/1997 |
| WO | 03018853 A2 | 3/2003 |

OTHER PUBLICATIONS

Extended European Search Report for related application 13166811.3 dated Feb. 26, 2016; 7 pp.

AU Patent Examination Report No. 1 dated Jul. 29, 2016 for related application 2013200999; 4 pp.

2nd China Office Action for related application 2013101811216 dated Sep. 21, 2016; 14 pp.

Canada Office Action for related application 2,806,095 dated Dec. 2, 2016, 5 pp.

Notice of Reasons for Rejection, JP Patent Application No. 2013-102787, dated Mar. 7, 2017, 4 pages.

Chinese Office Action for related application 2013101811216 dated Mar. 28, 2017, 13 pp.

Fourth China Office Action dated Oct. 9, 2017 for related application 201310181121.6; 21 pp.

Canada Office Action for related application 2,806,095 dated Sep. 26, 2017, 4 pp.

EP Examination Report for related application 13166811.3 dated Sep. 17, 2018; 6 pp.

Chopra, Inderjit; "Development of a Smart Rotor"; Proceedings of the European Rotorcraft Forum, Cernobbio, Italy; Sep. 14-16, 1993; vol. 2, pp. N6-00.

CA Office Action for related application 2,806,095 dated Jul. 11, 2018; 4 pp.

China Office Action for related application 201310181121.6 dated Mar. 30, 2018; 19 pp.

Chopra, Inderjit; "Development of a Smart Rotor", Proceedings of the European Rotorcraft Forum, Cernobbio, Sep. 14-16, 1993; vol. 2, pp. 11-14.

European Application Serial No. 19205464.1, Search Report dated Feb. 28, 2020.

* cited by examiner

SHAPE MEMORY ALLOY ACTIVE SPARS FOR BLADE TWIST

BACKGROUND OF THE DISCLOSURE

The field of the disclosure relates generally to spars for aircraft wings and rotor blades, and more particularly, to shape memory alloy active spars.

Shape memory alloys (SMA) are a group of metals that have interesting thermal and mechanical properties. Shape memory alloys can exist in one of several distinct temperature-dependent phases. The most commonly utilized of these phases are the so-called martensite and austenite phases. Upon heating a shape memory alloy through a transformation temperature, the shape memory alloy changes from the martensite phase into the austenite phase.

A shape memory alloy material, for example, NiTinol that is deformed while in a martensitic state (low yield strength condition) and then heated to its transition temperature to reach an austenitic state where the shape memory alloy material will resume its original (non-deformed) shape. The rate of return to the original shape depends upon the amount and rate of thermal energy applied to the component. When the shape memory alloy material is cooled, the shape memory alloy material will return to the martensitic state and shape.

Structural spars are used in aircraft wings, rotor blades, as well as non-aerospace structures for strength and to facilitate the shape of the structures. Mechanical and/or electrical actuation systems are sometimes used to change the shape of structures that include spars. However these mechanical and/or electrical actuation systems are complex, take up space and add weight. There is a need for a means of changing the shape of structural spars that does not have these known detrimental characteristics.

SUMMARY

In one aspect, a system for changing a shape of a structural spar is provided. The system includes a plurality of adjoining structural strips axially aligned to form the structural spar. At least one of the structural strips is formed from a shape memory alloy. The system also includes a temperature control system to control a temperature of the at least one shape memory alloy strip. Heat applied to the at least one shape memory alloy strip causes the structural spar to twist or bend.

In another aspect, a structural spar is provided. The structural spar includes a plurality of adjoining structural strips to form the structural spar. At least one of the structural strips is a shape memory alloy strip. The structural spar also includes at least one heating element positioned adjacent the at least one shape memory alloy strip to change a temperature of the at least one shape memory alloy strip. Heat applied to the at least one shape memory alloy strip causes the structural spar to twist or bend.

In another aspect, a method of twisting a rotor blade is provided. The method includes forming a structural spar from a plurality of adjoining structural strips axially aligned to form the structural spar, with at least one of the strips comprising a shape memory alloy strip. The method also includes attaching a temperature control system to the structural spar to control a temperature of the at least one shape memory alloy strip, and applying heat to the at least one shape memory alloy strip to cause the structural spar to twist which twists the rotor blade.

The features, functions, and advantages that have been discussed can be achieved independently in various embodiments or may be combined in yet other embodiments further details of which can be seen with reference to the following description and drawings.

DETAILED DESCRIPTION OF THE DISCLOSURE

Shape memory alloy active spars for aircraft wings and rotors are described in detail below. A system for changing the shape of an aircraft structural spar in an exemplary embodiment includes a plurality of adjoining structural strips axially aligned to form the structural spar. At least one of the strips is formed from a shape memory alloy. Shape memory materials are characterized by a shape transition both upon heating from the martensite phase of the material to the austenite phase. Upon cooling, the shape memory alloy moves from the austenite phase back to the martensite phase. The system also includes a temperature control system to control the temperature of the shape memory alloy strips. Heat applied to the shape memory alloy strips move to the austenite phase where the shape memory alloy strips changes to the trained/morphed configuration (twisted configuration) which causes the structural spar to twist. The twist of the structural spar will twist, for example, a helicopter rotor blade. The twist in the rotor blade provides aerodynamic optimization between hover and forward flight, and increases lift capacity. Aerodynamic optimization between hover and forward flight produces cost savings, for example, fuel savings that may be attributed to increased envelope performance. In addition, the blade twist may permit integration of higher harmonic control technologies in the blade. It should be understood that the description below references an exemplary helicopter rotor blade, but may also be utilized in an aircraft wing and other structures for both aerospace and non-aerospace applications.

Figure 1:
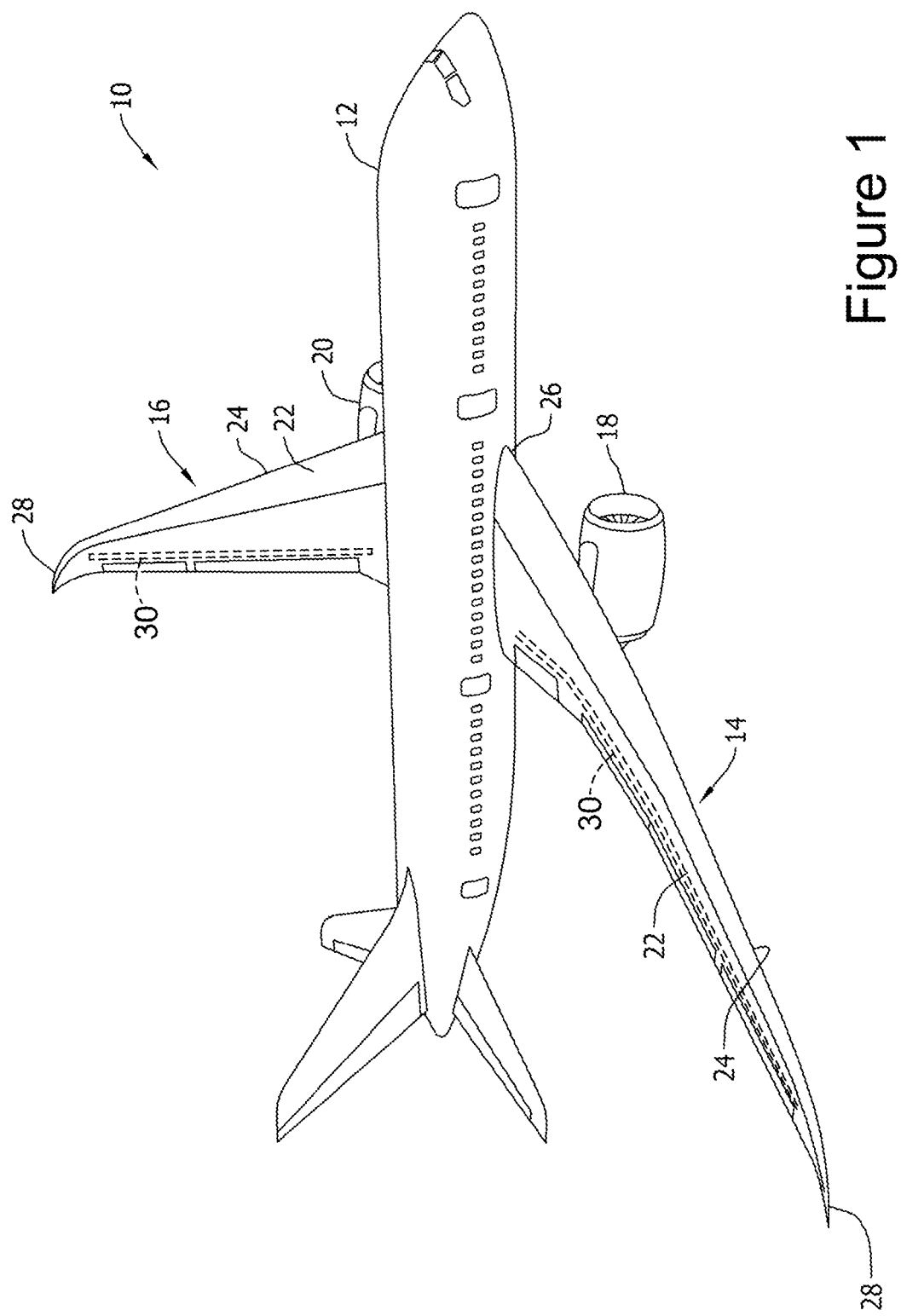
FIG. 1 is a perspective illustration of an aircraft.

Referring to the drawings, FIG. 1 is a perspective illustration of an exemplary aircraft 10 that includes a fuselage 12, wings 14 and 16 attached to fuselage 12, and engines 18 and 20 attached to wings 14 and 16 respectively. Wings 14 and 16 have an upper wing skin 22, lower wing skin 24, a wing root 26, a wing tip 28, and at least one spar 30 between upper wing skin 22 and lower wing skin 24.

Figure 2:
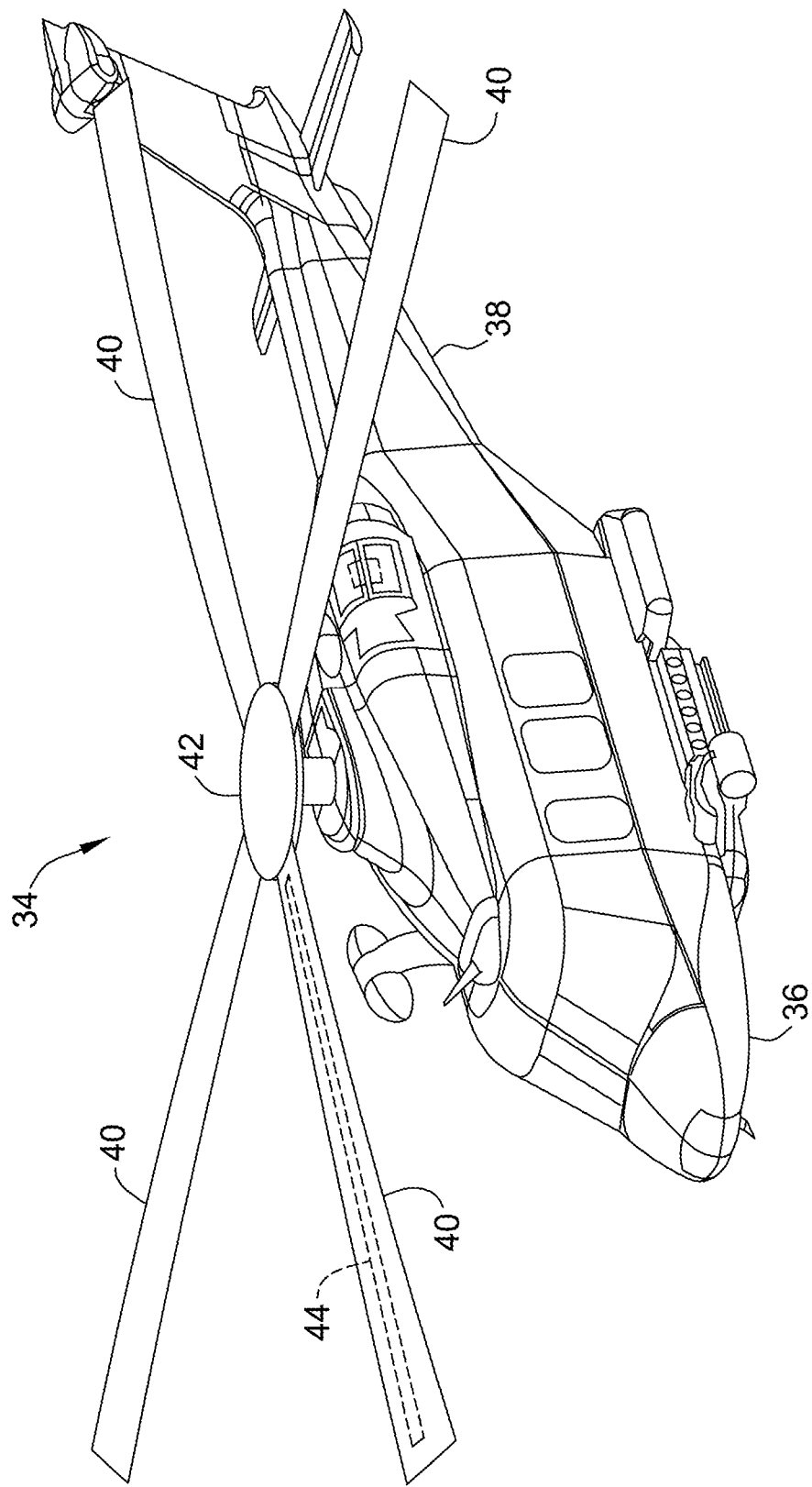
FIG. 2 is a perspective illustration of a helicopter.

FIG. 2 is a perspective illustration of an exemplary helicopter 34 that includes a fuselage 36, a tail boom 38 and a plurality of rotor blades 40. Rotor blades 40 are coupled to a hub 42. Rotor blades 40 include at least one structural spar 44 extending from a root 46 to a tip 48 (each shown in FIG. 3) of rotor blade 40.

Figure 3:
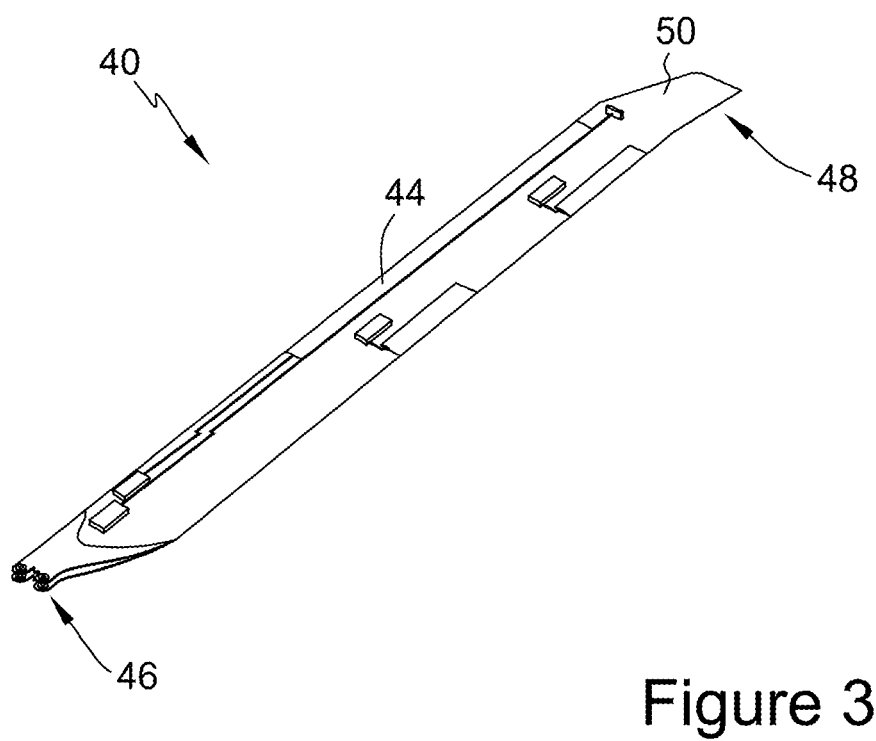
FIG. 3 is a perspective illustration of a helicopter blade shown in FIG. 2.
Figure 4:
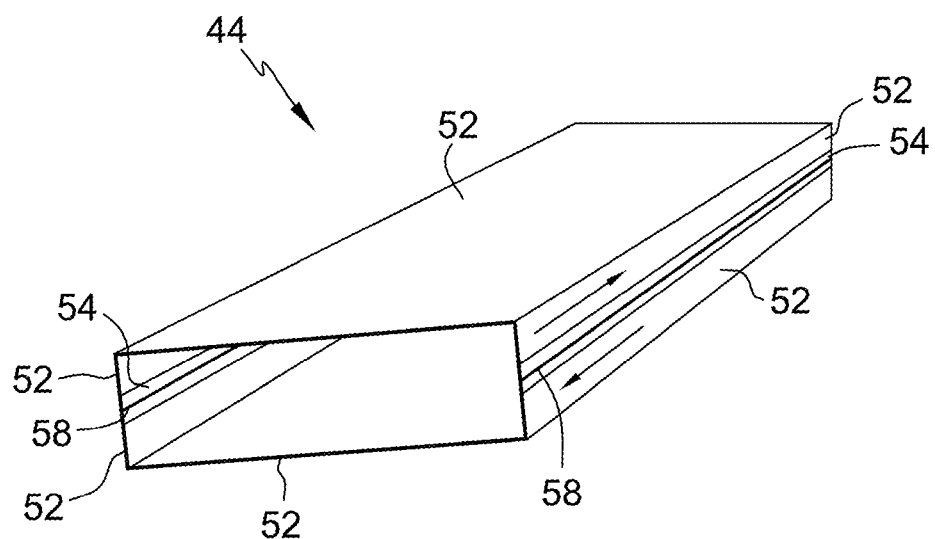
FIG. 4 is an enlarged perspective illustration of a portion of the spar shown in FIG. 3.

FIG. 3 is a perspective illustration of an exemplary embodiment of rotor blade 40 having a structural spar 44, and FIG. 4 is an enlarged perspective illustration of a portion of structural spar 44. Rotor blade 40 includes a root 46 connected to hub 42 (shown in FIG. 2) and a blade tip 48. Structural spar 44 extends longitudinally between blade root 46 and the blade tip 48 and a surrounding aerodynamically-shaped structural skin 50. The shape of structural spar 44 is generally rectangular, and the shape of structural skin 50 is of a cambered airfoil. Other shapes of structural 50 may also be used.

Structural spar 44 is formed from a plurality of structural strips 52 axially aligned. At least one or more of structural strips 52 are made from a shape memory alloy forming shape memory alloy strips 54. The use of shape memory alloy strips 54 exploit the difference between spar open channel stiffness and closed channel stiffness to change the shape of structural spar 44. Shape memory alloy strips 54 are used to replace one or more structural strips 52 of structural spar 44. Any suitable shape memory alloy may be used, for example, but not limited to, nickel-titanium based alloys, nickel-titanium-platinum based alloys, indium-titanium based alloys, nickel-aluminum based alloys, nickel-aluminum-platinum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, ruthenium-niobium based alloys, ruthenium-tantalum based alloys, titanium based alloys, iron based alloys, and the like.

Two-way shape memory materials are characterized by a shape transition both upon heating from the martensite phase to the austenite phase, as well as upon cooling from the austenite phase back to the martensite phase. Shape memory alloy structures that exhibit a two-way shape memory effect are fabricated from a shape memory alloy composition that will revert to its "remembered" low-temperature shape. Two-way shape memory behavior is imparted by training the shape memory material through processing. Such processing can include extreme deformation of the material while in the austenite phase, and heating-cooling under constraint, load, and/or sheer. Once the material has been trained to exhibit the two-way shape memory effect, the shape change between the low and high temperature states is generally reversible and persists through a high number of thermal cycles.

Shape memory alloy strips 54 may be trained to deform the desired austenite (e.g., twisted or bent) shape. In one embodiment, shape memory alloy strips 54 are trained under shear. When the shape memory alloy material is cooled to the martensite phase, shape memory alloy strips 54 revert back to the non-deformed shape of shape memory alloy strips 54.

A temperature control system 56 (shown in FIG. 5) may be used to control the temperature of shape memory alloy strips 54. Temperature control system 56 includes a heating element 58 that may be a resistive wire on a flexible film or in a solid module. Also, an insulated Nichrome ribbon may be suitable for use as heating element 58. Nichrome is a non-magnetic alloy of nickel, chromium, and often iron. Nichrome is a resistance wire or ribbon that may be used as a heating element. Nichrome ribbons are commercially available from Driver Harris Co., Madison Ave Morristown, N.J. Heating element 58 is positioned adjacent a shape memory alloy strip 54 to facilitate heating the shape memory alloy to move from the martensite phase to the austenite phase where shape memory alloy strip 54 twists (or bends) which causes blade 40 to twist (or bend). When the temperature of shape memory alloy strip 54 cools, the shape memory alloy material returns back to the martensite phase where shape memory alloy strip 54 reverts to the non-deformed shape which causes blade 40 to revert to the non-twisted (or non-bent) shape.

Figure 5:
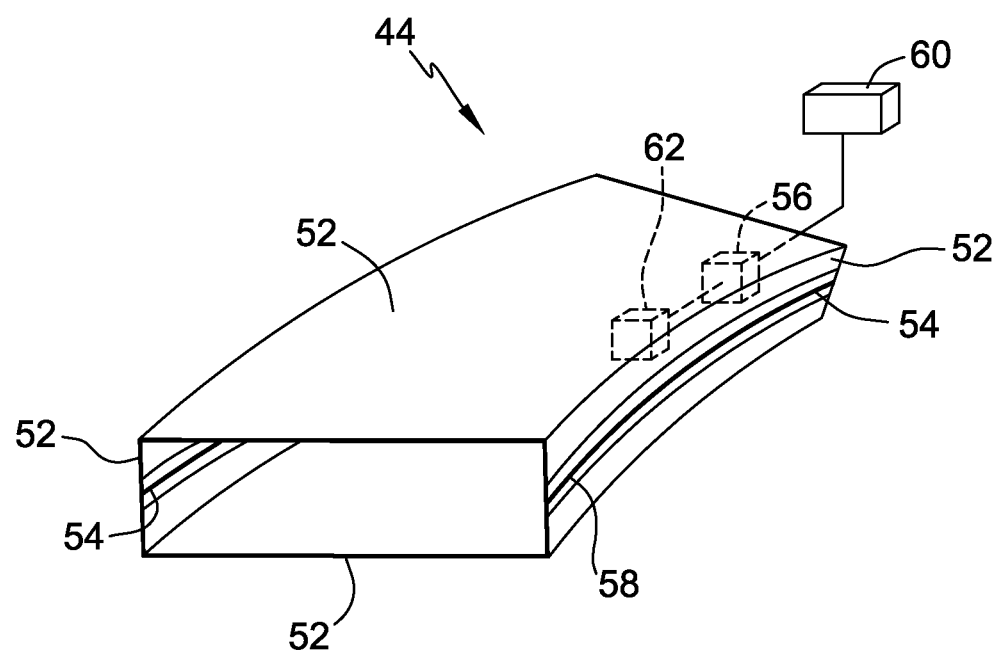
FIG. 5 is an enlarged perspective illustration of a portion of the spar shown in FIG. 4 and that is in a twisted state.

FIG. 5 is an enlarged perspective illustration of a portion of structural spar 44 in a twisted state. A non-twisted state of structural spar 44 is shown in FIG. 4. To move structural spar 44 from the non-twisted state to the twisted state, temperature control system 56 permits power, from a power source 60, to flow through heating element 58 attached to shape memory alloy strip 54. The power flowing through heating element 58 raises the temperature of heating element 58 that in-turn raises the temperature of shape memory alloy strip 54. The increased temperature moves the shape memory alloy of shape memory alloy strip 54 from the martensite phase to the austenite phase. As explained above, shape memory alloy strip 54 may be trained under shear to deform to the desired austenite (e.g., twisted or bent) shape. By moving shape memory alloy strip 54 to the austenite phase, shape memory alloy strip 54 twists causing structural spar 44 to twist which then twists rotor blade 40. The temperature control system 56 can lower the amount of power flowing through heat element 58 to lower the temperature of shape memory alloy strip 54 to move the shape memory alloy of shape memory alloy strip 54 from the austenite phase to the martensite phase. Shape memory alloy strip 54 will then revert to the non-twisted state causing rotor blade 40 to revert to a non-twisted state. In one embodiment, a deflection monitoring apparatus 62 may be used to monitor the amount of deflection of structural spar 44. Deflection monitoring apparatus 62 is coupled to temperature control system 56 and sends signals to temperature control system 56 to raise or lower the temperature of shape memory alloy strip 54 to increase or decrease the amount of deflection of structural spar 44.

Figure 6:
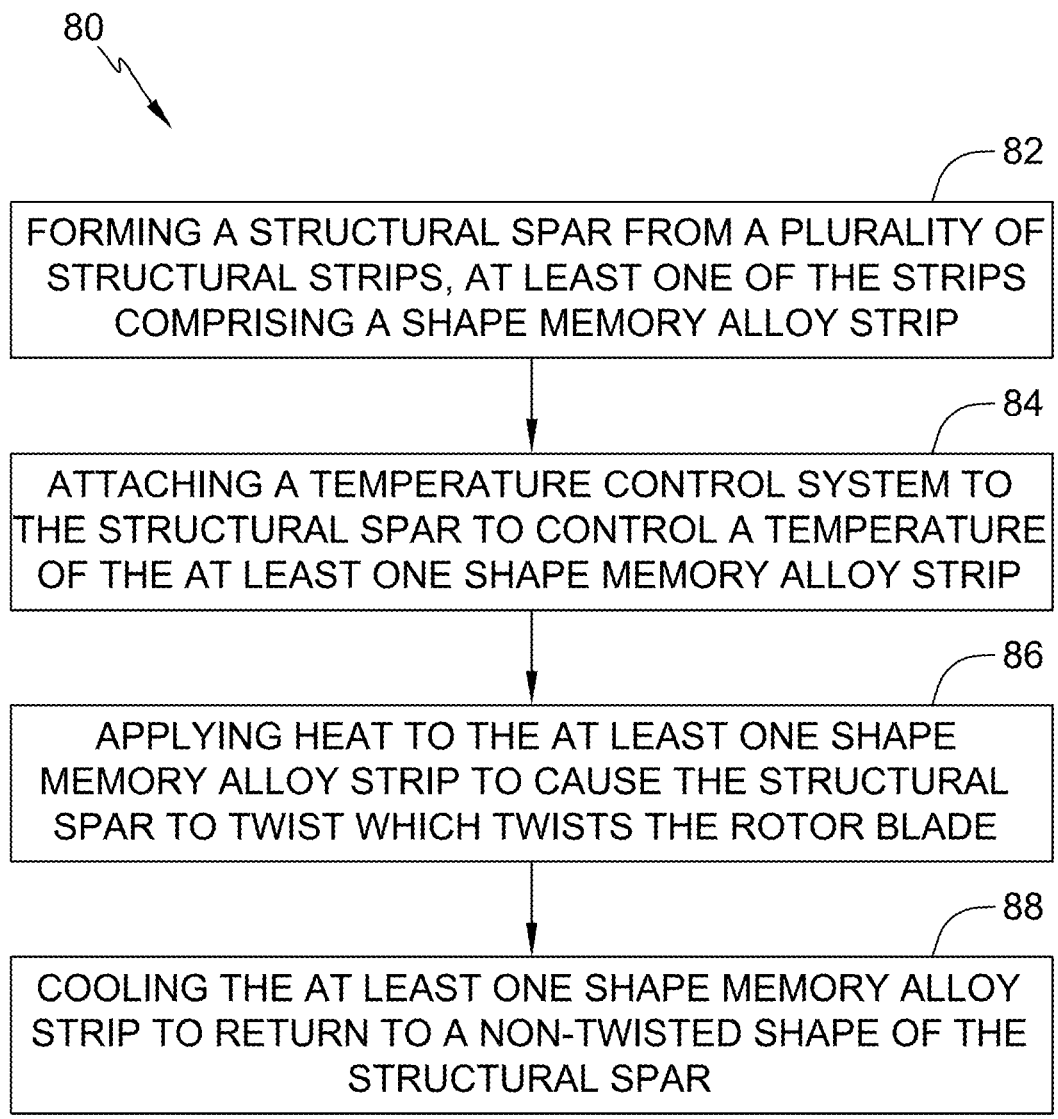
FIG. 6 of a block flow diagram of a method of twisting a rotor blade.

Referring to FIG. 6, a method 80 of twisting a rotor blade includes the step of forming 82 a structural spar of a rotor blade from a plurality of structural strips, at least one of the structural strips is a shape memory alloy strip. Any suitable shape memory alloy, described above, may be used to form the shape memory alloy strips. Method 80 also includes the step of attaching 84 a temperature control system to the structural spar to control a temperature of the at least one shape memory alloy strip. The temperature control system includes at least one heating element attached to the at least one shape memory alloy strip. Further, method 80 includes the step of applying heat 86 to the at least one shape memory alloy strip to cause the structural spar to twist which twists the rotor blade. Heating the shape memory alloy strip moves the shape memory alloy from the martensite phase to the austenite phase causing the shape memory alloy strip to twist (or bend) which causes the rotor blade to twist (or bend). In addition, method 80 includes the step of cooling 88 the at least one shape memory alloy strip to return to a non-twisted shape of the structural spar which returns the rotor blade to the non-twisted shape of the rotor blade.

Figure 7:
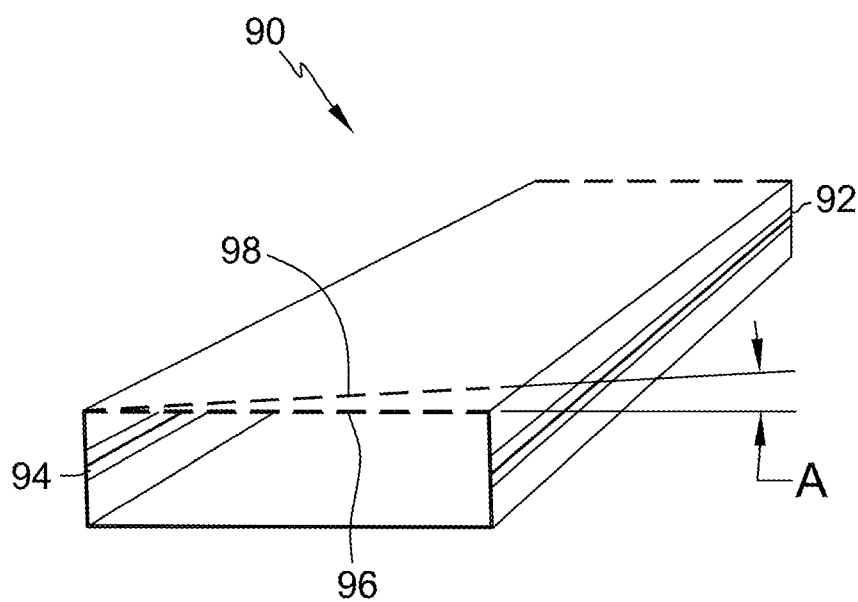
FIG. 7 is an enlarged perspective illustration of a portion of a spar that includes two shape memory alloy strips.

A sample finite element analysis was performed to show the ability of shape memory alloy integrated into a spar to twist the spar by the application of heat. FIG. 7 shows an enlarged perspective illustration of a portion of an active spar 90 that includes two shape memory alloy strips 92 and 94 positioned on opposite sides of spar 90. The properties of active spar 90 were measured at normal temperature and at a raised temperature of shape memory alloy strips 92 and 94 that caused active spar 90 to twist. Dashed lines 96 and 98 show the movement of spar 90 from the baseline to the activated spar. Line 96 indicates the position of active spar 90 at normal temperature, and line 98 indicates the position of active spar 90 at a raised temperature of shape memory alloy strips 92 and 94. A rotation angle A of active spar 90 is shown between lines 96 and 98 during the changes of position (twisting) of active spar 90. Rotation angle A was about 4 degrees at the raised temperature of shape memory strips 92 and 94. In the example finite element analysis, each 12 inches of active spar 90 twists 2 degrees and weighs an additional 1.5 pounds as compared to non-active spars. The measured properties are shown in Table I, below.

TABLE I

| Spar Properties | Spar Baseline | Spar Activated |
|---|---|---|
| Spar Width (in) | 6 | 6 |
| Height (in) | 2 | 2 |
| Thickness | 0.286 | 0.329 |
| Length (in) | 24 | 24 |
| SMA Thickness (in) | 0 | 0.3 |
| SMA Height (in) | 0 | 0.775 |
| Rotation Angle (degree) | 0 | 4 |
| JG (M lb-in$^2$) | 25 | 25 |
| Weight (lbs) | 9.09 | 12.73 |
| Bending Stiffness (short) (Msi) | 25.2 | 26.4 |
| Bending Stiffess (long) (Msi) | 157 | 150 |
| Extension Stiffness (Msi) | 425 | 450 |

Shape memory alloy active spars 44 and 90 described above may be used in aircraft wings or empennages, rotors, and other aero and non-aero structures, components and elements, including ground structures and ground based vehicles, water based structures, and vehicles. The use of shape memory alloy materials in spars 44 and 90 facilitate twisting, bending, and other configurations of spars 44 and 90. Changing the configuration of spars 44 and 90 may facilitate aerodynamic optimization of aircraft wings, rotors, and/or aero structures. Aerodynamic optimization may produce cost savings, for example, fuel savings that may be attributed to increased envelope performance.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hollow structural spar comprising:
    a first wide side;
    a second wide side, opposite of the first wide side;
    a first narrow side, connecting the first wide side and the second wide side;
    a second narrow side, opposite of the first narrow side and further connecting the first wide side and the second wide side;
    a plurality of structural strips, comprising a first U-shaped structural strip and a second U-shaped structural strip, wherein the first U-shaped structural strip forms the first wide side of the hollow structural spar, a first portion of the first narrow side of the hollow structural spar, and a first portion of the second narrow side of the hollow structural spar, and
    wherein the second U-shaped structural strip forms the second wide side of the hollow structural spar, a second portion of the first narrow side of the hollow structural spar, and a second portion of the second narrow side of the hollow structural spar;
    a first shape memory alloy strip, comprising
        a shape memory alloy, disposed between and interconnecting the first U-shaped structural strip and the second U-shaped structural strip, and forming a third portion of the first narrow side of the hollow structural spar, disposed between the first portion of the first narrow side and the second portion of the first narrow side;
    a second shape memory alloy strip, comprising a shape memory alloy, disposed between and interconnecting the first U-shaped structural strip and the second U-shaped structural strip, and forming a third portion of the second narrow side of the hollow structural spar, disposed between the first portion of the second narrow side and the second portion of the second narrow side; and
    a temperature control system, configured to independently control temperatures of the first shape memory alloy strip and the second shape memory alloy strip and comprising a first heating element, directly interfacing the first shape memory alloy strip, and a second heating element, directly interfacing the second shape memory alloy strip.

2. The hollow structural spar accordance with claim 1, wherein the shape memory alloy comprises at least one of nickel-titanium based alloys, nickel-titanium-platinum based alloys, indium-titanium based alloys, nickel-aluminum based alloys, nickel-aluminum-platinum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, ruthenium-niobium based alloys, or ruthenium-tantalum based alloys.

3. The hollow structural spar in accordance with claim 1, wherein at least one of the first shape memory alloy strip or the second shape memory alloy strip is trained under shear.

4. The hollow structural spar in accordance with claim 1, wherein said hollow structural spar is positioned in one of a rotor blade, an aircraft wing, or an aircraft empennage.

5. The hollow structural spar in accordance with claim 1, wherein each of the first shape memory alloy strip and the second shape memory alloy strip is in a martensite phase, at a first temperature, and in an austenite phase, at a second temperature greater than said first temperature, such that changing from the martensite phase to the austenite phase of each of the first shape memory alloy strip and the second shape memory alloy strip causes the hollow structural spar to twist or bend from a non-twisted shape to a twisted shape.

6. The hollow structural spar in accordance with claim 5, wherein a twist angle between the non-twisted shape to the twisted shape is 4'.

7. The hollow structural spar in accordance with claim 5, wherein the hollow structural spar is returned to the non-twisted shape when each of the first shape memory alloy strip and the second shape memory alloy strip changes from the austenite phase to the martensite phase.

8. The hollow structural spar in accordance with claim 1, wherein the first U-shaped structural strip, the second U-shaped structural strip, the first shape memory alloy strip, and second the shape memory alloy strip enclose a cavity of the hollow structural spar, the cavity being empty and free from any materials.

9. The hollow structural spar in accordance with claim 8, wherein the first shape memory alloy strip and second the shape memory alloy strip are exposed within the cavity.

10. The hollow structural spar in accordance with claim 8, wherein the first shape memory alloy strip and second the shape memory alloy strip are positioned on opposite sides of the cavity.

11. The hollow structural spar in accordance with claim 8, wherein the cavity has a rectangular cross-section.

12. The hollow structural spar in accordance with claim 1, wherein each of the first heating element and the second heating element is a resistive wire, supported with a flexible film.

13. The hollow structural spar in accordance with claim 12, wherein the resistive wire of each of the first heating element and the second heating element is a nichrome ribbon.

14. The hollow structural spar in accordance with claim 1, further comprising a deflection monitoring apparatus, monitoring deflection of the hollow structural spar and controlling operation of the first heating element and the second heating element.

15. The hollow structural spar in accordance with claim 1, wherein a width-to-height ratio of the hollow structural spar is 3.

16. The hollow structural spar in accordance with claim 1, wherein a length-to-width ratio of the hollow structural spar is 4.

17. A helicopter rotor blade comprising:
a root, for connecting to a hub of a helicopter;
a tip, opposite of the root along a length of the helicopter rotor blade;
a hollow structural spar, forming an edge of the helicopter rotor blade and extending along the length of the helicopter rotor blade between the root and the tip, and comprising:
a first wide side,
a second wide side, opposite of the first wide side,
a first narrow side, connecting the first wide side and the second wide side,
a second narrow side, opposite of the first narrow side and further connecting the first wide side and the second wide side,
a plurality of structural strips, comprising a first U-shaped structural strip and a second U-shaped structural strip,
wherein the first U-shaped structural strip forms the first wide side of the hollow structural spar, a first portion of the first narrow side of the hollow structural spar, and a first portion of the second narrow side of the hollow structural spar, and
wherein the second U-shaped structural strip forms the second wide side of the hollow structural spar, a second portion of the first narrow side of the hollow structural spar, and a second portion of the second narrow side of the hollow structural spar,
a first shape memory alloy strip, comprising a shape memory alloy, disposed between and interconnecting the first U-shaped structural strip and the second U-shaped structural strip, and forming a third portion of the first narrow side of the hollow structural spar, disposed between the first portion of the first narrow side and the second portion of the first narrow side,
a second shape memory alloy strip, comprising a shape memory alloy, disposed between and interconnecting the first U-shaped structural strip and the second U-shaped structural strip, and forming a third portion of the second narrow side of the hollow structural spar, disposed between the first portion of the second narrow side and the second portion of the second narrow side, and
a temperature control system, configured to independently control temperatures of the first shape memory alloy strip and the second shape memory alloy strip and comprising a first heating element, directly interfacing the first shape memory alloy strip, and a second heating element, directly interfacing the second shape memory alloy strip; and
a structural skin, attached to the hollow structural spar and shaped as a cambered airfoil.

18. The helicopter rotor blade in accordance with claim 17, wherein the hollow structural spar has a rectangular cross-section within a plane perpendicular to the length of the helicopter rotor blade.

19. The helicopter rotor blade in accordance with claim 17, wherein each of the first shape memory alloy strip and the second shape memory alloy strip is configured to switch from a martensite phase and a austenite phase upon heating and back to the martensite phase upon cooling, such that the martensite phase corresponds to a non-twisted shape of the hollow structural spar and the austenite phase corresponds to a twisted shape of the hollow structural spar.

20. The helicopter rotor blade in accordance with claim 19, wherein the non-twisted and the twisted shape of the hollow structural spar correspond to different lift capacities of the helicopter rotor blade.

* * * * *